(12) United States Patent
Pavley et al.

(10) Patent No.: US 6,317,141 B1
(45) Date of Patent: Nov. 13, 2001

(54) METHOD AND APPARATUS FOR EDITING HETEROGENEOUS MEDIA OBJECTS IN A DIGITAL IMAGING DEVICE

(75) Inventors: John F. Pavley, Cupertino; Eric C. Anderson, San Jose, both of CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/223,960

(22) Filed: Dec. 31, 1998

(51) Int. Cl.$^7$ .................................................. G06K 15/00
(52) U.S. Cl. ........................ 345/732; 345/864; 345/723
(58) Field of Search ................................ 345/328, 327, 345/348, 349, 352–354, 356, 333, 334, 338, 339, 340, 342, 346; 707/5, 10

(56) References Cited

U.S. PATENT DOCUMENTS 5,675,752 * 10/1997 Scott et al. ............................. 345/333
5,752,244 * 5/1998 Rose et al. ................................ 707/5
6,072,479 * 6/2000 Ogawa .................................. 345/302
6,078,005 * 6/2000 Kurakake et al. ...................... 84/477

* cited by examiner

*Primary Examiner*—Steven Sax
(74) *Attorney, Agent, or Firm*—Sawyer Law Group LLP

(57) ABSTRACT

A method and apparatus for editing heterogeneous media objects in a digital imaging device having a display screen, where each one of the media objects has one or more media types associated therewith, such as a still image, a sequential image, video, audio, and text. The method aspect of the present invention begins by displaying a representation of each one of the media objects on the display screen to allow a user to randomly select a particular media object to edit. In response to a user pressing a key to edit a selected media object, one or more specialized edit screens is invoked for editing the media types associated with the selected media object. If the media object includes a still or a sequential image, then an image editing screen is invoked. If the media object includes a video clip, then a video editing screen is invoked. If the media object includes an audio clip, then an audio editing screen is invoked. And if the media object includes a text clip, then a text editing screen is invoked.

17 Claims, 13 Drawing Sheets

| Icon | Media Types |
|---|---|
| □ | Single Still Image |
| 🗐 | Burst or Time Lapse |
| ▤ | Panorama |
| 🎞 | Video |
| 📢 | Audio Clip |
| 📄 | Text File |
| ⋮ | ⋮ |

FIG. 3

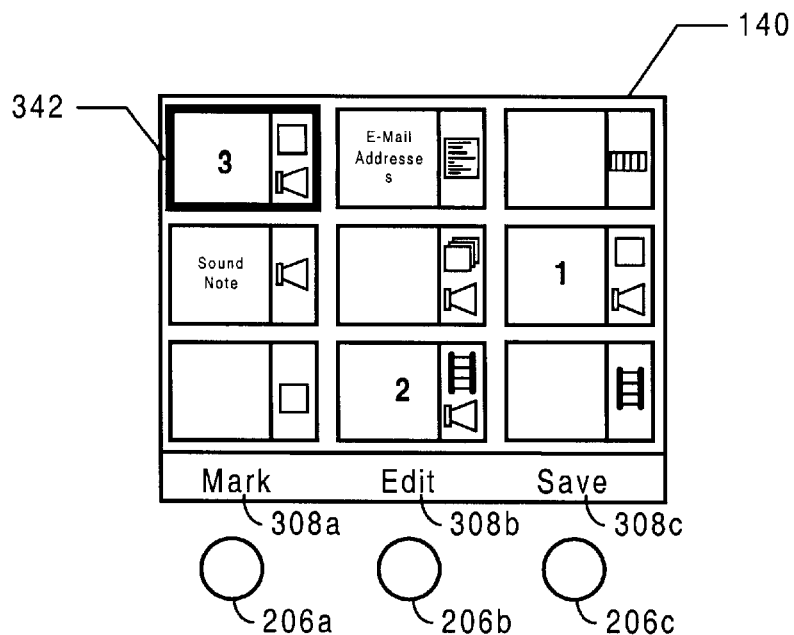
FIG. 8
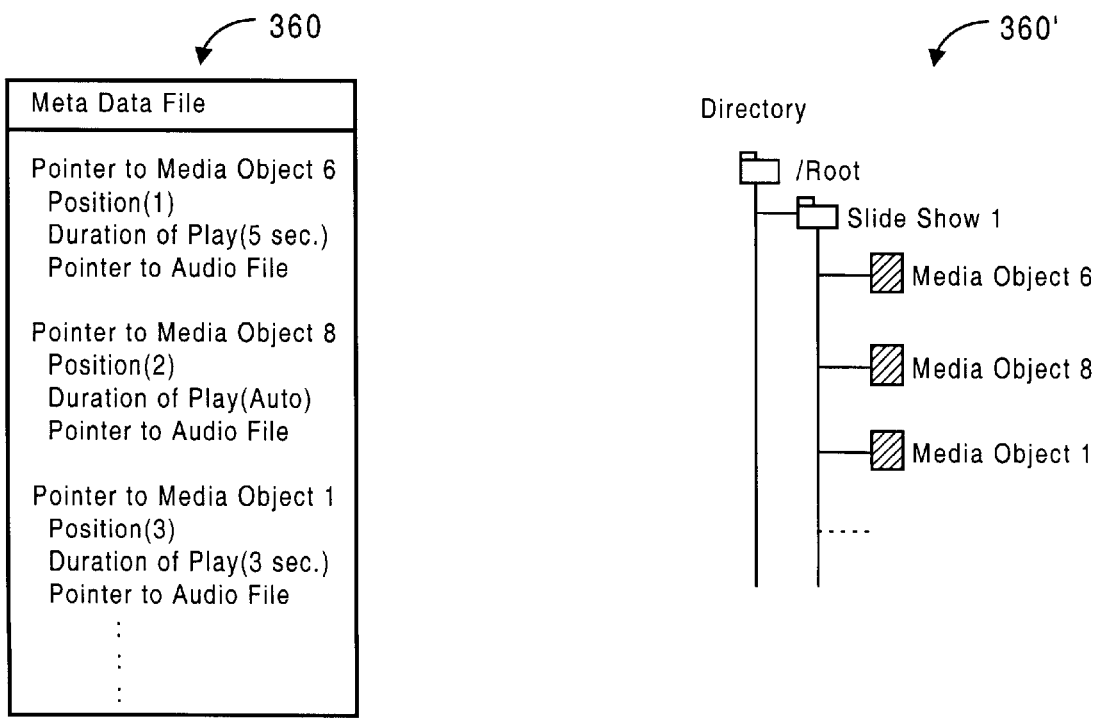
FIG. 9A
FIG. 9B

METHOD AND APPARATUS FOR EDITING HETEROGENEOUS MEDIA OBJECTS IN A DIGITAL IMAGING DEVICE

CROSS-REFERENCE TO RELATED APPLICATIONS

The present invention is related to the following co-pending U.S. patent applications: Ser. No. 08/702,286 entitled "Method and System For Grouping Images In A Digital Camera" filed on Sep. 26, 1996; and Ser. No. 08/716,018 entitled "Method And System For Displaying Images And Associated Media Types In The Interface Of A Digital Camera," filed Sep. 9, 1996.

The present invention is also related to the following co-pending U.S. patent applications: Ser. No. 09/223,962 entitled "Method And Apparatus For Creating A Multimedia Presentation From Heterogeneous Media Objects In A Digital Imaging Device," and Ser. No. 09/223,961 entitled "Method And Apparatus For Creating An Interactive Slide Show In A Digital Imaging Device", both filed concurrently herewith.

FIELD OF THE INVENTION

The present invention relates generally to a digital imaging device and more particularly to a method and apparatus for creating, editing and presenting a multimedia presentation comprising heterogeneous media objects in the digital imaging device.

BACKGROUND OF THE INVENTION

The use of digital cameras is rapidly proliferating and they may one day overtake 35 mm SLR's in terms of worldwide sales. There are basically three types of digital cameras; digital still cameras, digital video cameras, and hybrid digital-video cameras.

Still digital cameras are used primarily for capturing high quality static photographs, and offer a less expensive alternative to digital video cameras. Still digital cameras are typically less expensive because they have far less processing power and memory capacity than digital video cameras.

Digital video cameras differ from digital still cameras in a number of respects. Digital video cameras are used to capture video at approximately thirty frames per second at the expense of image quality. Digital video cameras are more expensive than still cameras because of the extra hardware needed. The uncompressed digital video signals from all the low-resolution images require huge amounts memory storage, and high-ratio real-time compression schemes, such as MPEG, are essential for providing digital video for today's computers. Until recently, most digital video recorders used digital magnetic tape as the primary storage media, which has the disadvantage of not allowing random access to the data.

Hybrid digital-video cameras, also referred to as multimedia recorders, are capable of capturing both still JPEG images and video clips, with or without sound. One such camera, the M2 Multimedia Recorder by Hitachi America, Ltd., Brisbane, Calif., stores the images on a PC card hard disk (PCMCIA Type III), which provides random access to the recorded video data.

All three types of cameras typically include a liquid-crystal display (LCD) or other type of display screen on the back of the camera. Through the use of the LCD, the digital cameras operate in one of two modes, record and play. In record mode, the display is used as a viewfinder in which the user may view an object or scene before taking a picture. In play mode, the display is used a playback screen for allowing the user to review previously captured images and/or video. The camera may also be connected to a television for displaying the images on a larger screen.

Since digital cameras capture images and sound in digital format, their use for creation of multimedia presentations is ideal. However, despite their capability to record still images, audio, and video, today's digital cameras require the user to be very technologically proficient in order to create multimedia presentations.

For example, in order to create a multimedia presentation, the user first captures desired images and video with the camera, and then downloads the images to a personal computer or notebook computer. There, the user may import the images and video directly into a presentation program, such as Microsoft PowerPoint™. The user may also edit the images and video using any one of a number of image editing software applications. After the PowerPoint presentation has been created, the user must connect the PC or notebook to a projector to display the presentation. Finally, the user typically controls the play back of the presentation using a remote control.

Due to the limitations of today's digital cameras in terms of capabilities and features, the user is forced to learn how to operate a computer, image editing software, and a presentation program in order to effectively create and display the multimedia presentation. As the use of digital cameras becomes increasingly mainstream, however, the number of novice computer users will increase. Indeed, many users will not even own a computer at all. Therefore, many camera owners will be precluded from taking advantage of the multimedia capabilities provided by digital cameras.

What is needed is an improved method for creating, editing, and displaying a multimedia presentation using images and/or video from a digital imaging device. The present invention addresses such a need.

SUMMARY OF THE INVENTION

The present invention provides a method and apparatus for editing heterogeneous media objects in a digital imaging device having a display screen, where each one of the media objects has one or more media types associated therewith, such as a still image, a sequential image, video, audio, and text. The method aspect of the present invention begins by displaying a representation of each one of the media objects on the display screen to allow a user to randomly select a particular media object to edit. In response to a user pressing a key to edit a selected media object, one or more specialized edit screens is invoked for editing the media types associated with the selected media object. If the media object includes a still or a sequential image, then an image editing screen is invoked. If the media object includes a video clip, then a video editing screen is invoked. If the media object includes an audio clip, then an audio editing screen is invoked. And If the media object includes a text clip, then a text editing screen is invoked.

According to the present invention, each one of the specialized editing screens operates in a similar manner to ease use and operation of the digital imaging device and to facilitate creation of multimedia presentations on the digital imaging device, without the need to download the contents of the camera to a PC for editing.

BRIEF DESCRIPTION OF THE DRAWINGS

FIG. 3 is a table listing example media types that may be captured and stored by the DVC.

FIGS. 6–8 are diagrams illustrating examples of marking heterogeneous media objects.

FIGS. 9A–B are diagrams illustrating a slide show object implemented as a metadata file.

DETAILED DESCRIPTION OF THE INVENTION

The present invention is a method and apparatus for creating and presenting a multimedia presentation comprising heterogeneous media objects stored in a digital imaging device. The following description is presented to enable one of ordinary skill in the art to make and use the invention and is provided in the context of a patent application and its requirements. Although the present invention will be described in the context of a digital video camera, various modifications to the preferred embodiment will be readily apparent to those skilled in the art and the generic principles herein may be applied to other embodiments. That is, any digital imaging device used to store and display and/or video, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
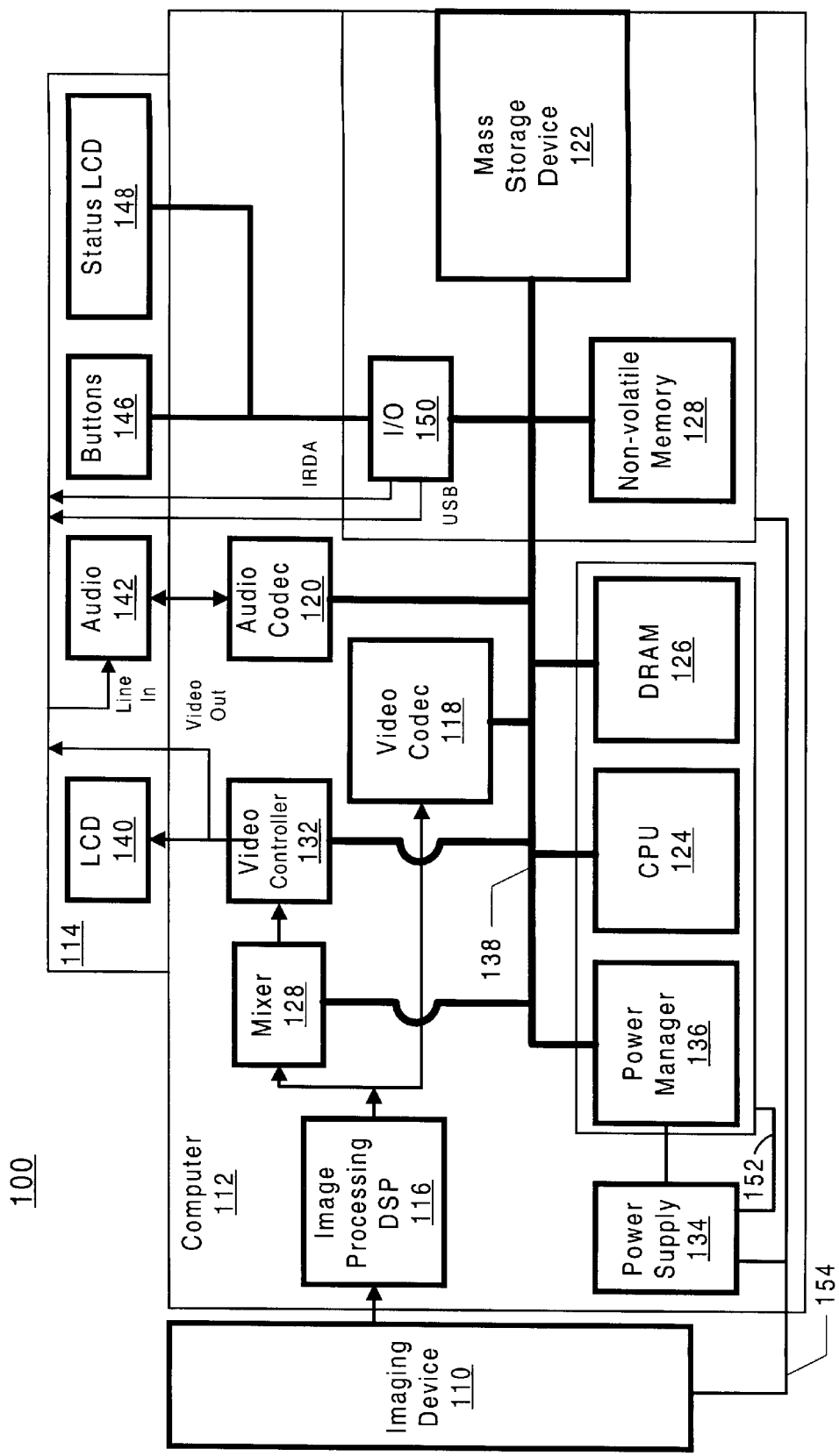
FIG. 1 is a block diagram illustrating of one preferred embodiment of a digital video camera (DVC) for use in accordance with the present invention.

Referring now to FIG. 1, a block diagram of one preferred embodiment of a digital video camera (DVC) is shown for use in accordance with the present invention. The DVC 100 is preferably capable of capturing and displaying various types of image data including digital video and high-resolution still images.

The DVC 100 comprises an imaging device 110, a computer 112, and a hardware user interface 114. The Imaging device 110 includes an image sensor (not shown), such as a charged coupled device (CCD) or a CMOS sensor, for capturing frames of image data in bayer format. The image frames are transferred from the imaging device 110 to the computer 112 for processing, storage, and display on the hardware user interface 114.

The computer 112 includes an image processing digital-signal-processor (DSP) 1 16, a video codec 132, an audio codec 132, a mass storage device 122, a CPU 124, a DRAM 126, an internal nonvolatile memory, a mixer, and a video control 132. The computer 112 also includes a power supply 134, a power manager 136, and a system bus 138 for connecting the main components of the computer 112.

The hardware interface 114 for interacting with the user includes a display screen 140 for displaying the digital video and still images, an audio subsystem 142 for playing and recording audio, buttons and dials 146 for operating the DVC 100, and an optional status display 148.

The CPU 124 may include a conventional microprocessor device for controlling the overall operation of camera. In the preferred embodiment, the CPU 124 is capable of concurrently running multiple software routines to control the various processes of camera within a multithreaded environment. In a preferred embodiment, The CPU 124 runs an operating system that includes a menu-driven GUI. An example of such software is the Digita™ Operating Environment by FlashPoint Technology of San Jose, Calif. Although the CPU 124 is preferably a microprocessor, one or more DSP 116's (digital signal processor) or ASIC's (Application Specific Integrated Circuit) could also be used.

Non-volatile memory 128, which may typically comprise a conventional read-only memory or flash memory, stores a set of computer readable program instructions that are executed by the CPU 124. Input/Output interface (I/O) 150 is an interface device allowing communications to and from computer 112. For example, I/O 150 permits an external host computer (not shown) to connect to and communicate with computer 118.

Dynamic Random-Access-Memory (DRAM) 126 is a contiguous block of dynamic memory that may be selectively allocated for various storage functions. DRAM 126 temporarily stores both raw and compressed image data and is also used by CPU 124 while executing the software routines used within computer 112. The raw image data received from imaging device 110 is temporarily stored in several input buffers (not shown) within DRAM 126. A frame buffer (not shown) is used to store still image and graphics data via the video control 132 and/or the mixer.

Power supply 134 supplies operating power to the various components of camera. Power manager 136 communicates via line with power supply 134 and coordinates power management operations for camera. In the preferred embodiment, power supply 134 provides operating power to a main power bus 152 and also to a secondary power bus 154. The main power bus 152 provides power to imaging device 110, I/O 150, Non-volatile memory 128 and removable memory. The secondary power bus 154 provides power to power manager 136, CPU 124 and DRAM 126.

Power supply 134 is connected to main batteries and also to backup batteries 360. In the preferred embodiment, a camera user may also connect power supply 134 to an external power source. During normal operation of power supply 134, the main batteries (not shown) provide operating power to power supply 134 which then provides the operating power to camera via both main power bus 152 and secondary power bus 154. During a power failure mode in which the main batteries have failed (when their output voltage has fallen below a minimum operational voltage level) the backup batteries provide operating power to power supply 134 which then provides the operating power only to the secondary power bus 154 of camera.

Figure 2A:
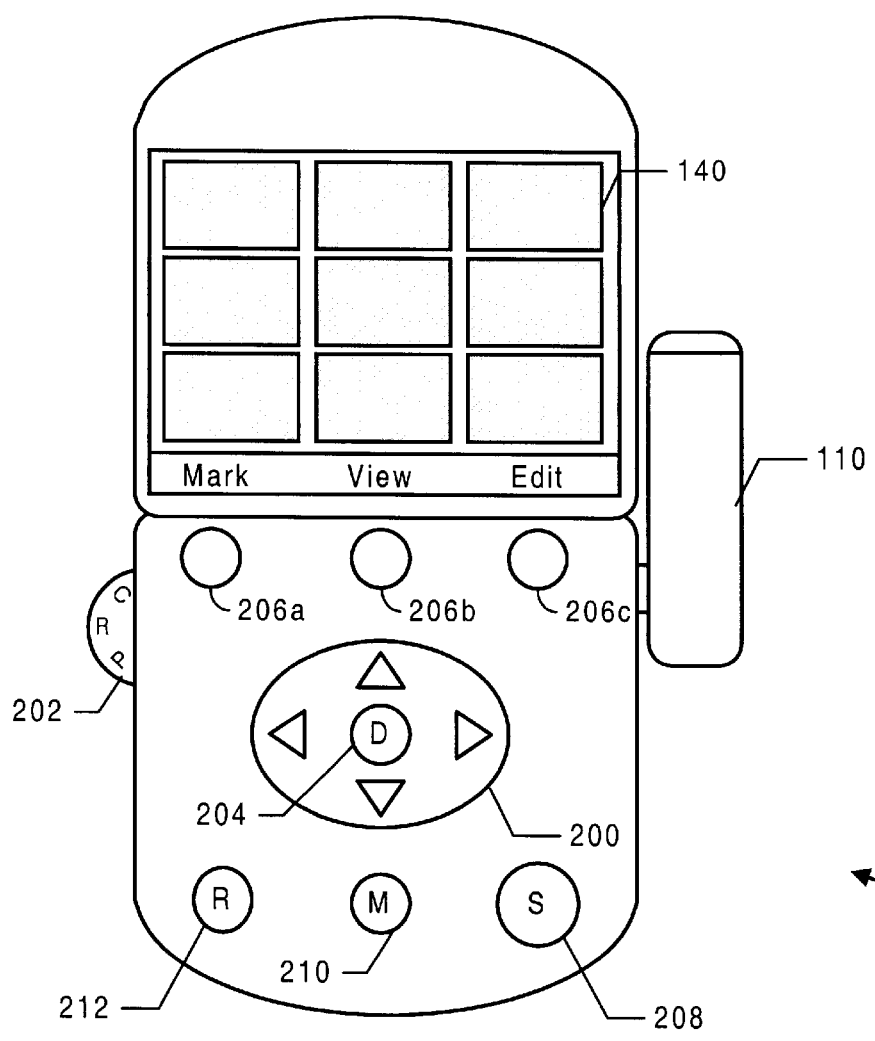
FIGS. 2A and 2B are diagrams depicting an exemplary form factor design for the DVC.
Figure 2B:
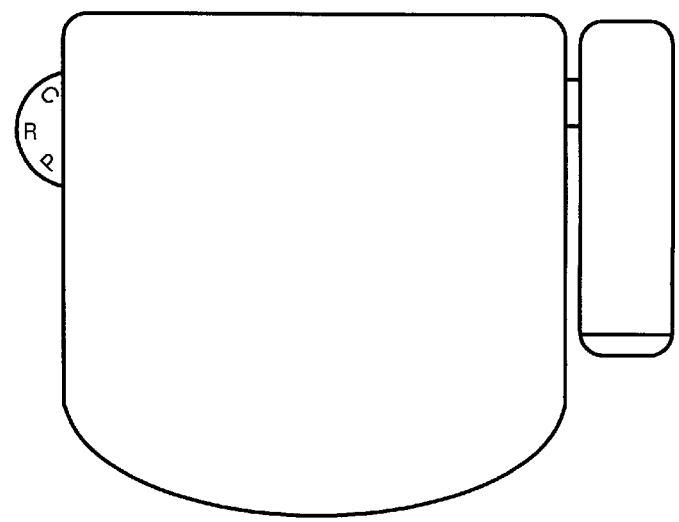

FIGS. 2A and 2B are diagrams depicting an exemplary form factor design for the DVC 100, shown here as a clam-shell design having a rotatable imaging device 110. FIG. 2A is a top view of the DVC 100 in an opened position, while FIG. 2B is a top view of the DVC 100 in a closed position. FIG. 2A shows the display screen 140, a four-way navigation control 200, a mode dial 202, a display button 204, a set of programmable soft keys 206, a shutter button 208, a menu button 210, and an audio record button 212.

The mode dial 202 is used to select the operating modes for DVC 100, which include a capture mode (C) for recording video clips and for capturing images, a review mode (R) for quickly viewing the video clips and images on the display screen 140, and a play mode (P) for viewing full-sized images on the display screen 140.

When the DVC 100 is placed into capture mode and the display screen 140 is activated, the camera displays a "live view" of the scene viewed through the camera lens on the display screen 140 as a successive series of real-time frames. If the display screen 140 is not activated, then the user may view the scene through a conventional optical viewfinder (not shown).

Referring to FIGS. 1 and 2A, during live view, the imaging device 110 transfers raw image data to the image processing DSP 116 at 30 frames per second (fps), or 60 fields per second. The DSP 116 performs gamma correction and color conversion, and extracts exposure, focus, and white balance settings from the image data and converts the data into CCIR 650 streaming video. (CCIR 650 is an international standard for digital video designed to encompass both NTSC and PAL analog signals, providing an NTSC-equivalent resolution of 720×486 pixels at 30 fps. It requires 27 MB per second and uses three signals: one 13.5 MB/sec luminance (gray scale) and two 6.75 MB/sec chrominance (color)).

After processing, the streaming video from the DSP 116 is transferred to the mixer for the overlay of optional graphics and/or images onto the video. The graphics data from the DRAM's 126 frame buffer is transferred to the mixer in synch with streaming video, where the mixer combines the graphic data with the video. After the streaming video and the graphics are combined, the video is displayed on the display screen 140 via the video control 132. A video out port is also provided to display the video on an external display device.

When the user initiates the video capture function to record the digital video, the streaming video output from the DSP 116 is also transferred to the video codec 132 for compression and storage. The video codec 132 performs MPEG-2 encoding on the streaming video during recording, and performs MPEG-2 decoding during playback. The video codec 132 may include local memory, such as 32 Mbits of SDRAM 126 for example, for MPEG-2 motion estimation between frames. Such video codecs 132 are commercially available from Sony Electronics (CXD1922Q0) and Matsushita Electronics Corp.

As the video codec 132 compresses the digital video, the compressed video stream is transferred to a temporary buffer in DRAM 126. Simultaneously, audio is recorded by the audio subsystem 142 and transferred to the audio codec 132 for compression into a compressed audio format, such MPEG Audio Layer 3 (MP3), which is common internet format. In an alternative embodiment, the audio could be compressed into AC-3 format, a well-known Dolby Digital audio recording technology that provides six surround-sound audio channels.

The CPU 124 mixes the compressed video and audio into a specified format, such as MPEG-2, for example. After the compressed MPEG-2 data is generated, the CPU 124 transfers the MPEG-2 data to the removable masss-storage device 122 for storage. In a preferred embodiment, the mass storage device 122 comprises a randomly accessible 3-inch recordable DVD drive from Toshiba/Panasonic, or a one-inch 340 MB MicroDrive™ from IBM, for example.

The video architecture inputs the video stream from the DSP 116 directly into the mixer, rather than first storing the video in memory and then inputting the video to the mixer, in order to save bus bandwidth. However, if sufficient bus bandwidth is provided (e.g., 100 MHz), the video stream could be first stored in memory.

Although the resolution of the display screen 140 may vary, the display screen 140 resolution is usually much less than the resolution of the image data that's produced by imaging device 110 when the user captures a still image at full resolution. Typically, the resolution of display screen 140 is ¼ the video resolution of a full resolution image. Since the display screen 140 is capable of only displaying images at ¼ resolution, the images generated during the live view process are also ¼ resolution.

As stated above, the DVC 100 is capable of capturing high-resolution still images in addition to video. When the user initiates the capture function to capture a still or sequential image, the image device captures a frame of image data at a resolution set by user. The DSP 116 performs image processing on the raw CCD data to convert the frame of data into YCC color format, typically YCC 2:2:2 format (YCC is an abbreviation for Luminance, Chrominance-red and Chrominance-blue). Alternatively, the data could be converted into RGB format (Red, Green, Blue).

After the still image has been processed, the image is compressed, typically in JPEG format, and stored as an image file on the mass storage device 122. A JPEG engine (not shown) for compressing and decompressing the still images may be provided in the image processing DSP 116, the video codec 132, provided as a separate unit, or performed in software by the CPU 124.

After the image has been compressed and stored, live view resumes to allow the capture of another image. The user may continue to either capture still images, capture video, or switch to play or review mode to playback and view the previously stored video and images on the display screen 140. In a preferred embodiment, the DVC 100 is capable of capturing several different media types, as shown in FIG. 3.

FIG. 3 is a table listing example media types that may be captured and stored by the DVC 100. Also shown are the corresponding icons that are used to indicate to the media type. The media types include a single still image, a time lapse or burst image, a panorama, a video segment, an audio clip, and a text file.

A still image is a high-quality, single image that may have a resolution of 1536×1024 pixels, for example. A time-lapse image is a series of images automatically captured by the DVC 100 at predefined time intervals for a defined duration (e.g. capturing a picture every five minutes for an hour). A burst image is similar to a time-lapse, but instead of capturing images for defined period of time, the DVC 100 captures as many images as possible in a brief time frame (e.g., a couple seconds). A panorama image is an image comprising several overlapping images of a larger scene that have been stitched together. A burst image, a time-lapse image, and a panorama image are each objects that include multiple still images, therefore, they may be referred to as a sequential images.

In addition to capturing different image-based media types, the DVC 100 can capture other media types, such as audio clips and text. The user can record a voice message to create a stand-alone audio clip, or the user may record a voice message and have it attached to an image to annotate the image. Audio clips may also be downloaded from an external source to add sound tracks to the captured objects.

A text media type is created by entering letters through the buttons on the user interface. The text along with graphics can be overlaid as watermarks on the images or, the text can be saved in a file to create a text-based media type.

In a preferred embodiment, one or more of the different media types can be combined to form a single media object. Since various combinations may be formed, such as single image with sound, or burst image with text, etc, the DVC 100 can be described at storing heterogeneous media objects, each comprising a particular combination of media types, such as images, video, sound, and text/graphics. Some types of media objects are formed automatically by the DVC 100, such as a captured image or an annotated image, others are formed manually by the user.

After media objects are created and stored, the user may view the media objects by switching the camera to play mode or review mode. In play mode, the camera 100 allows the user to view screen-sized images in the display screen 140 in the orientation that the image was captured. Play mode also allows the user to hear recorded sound associated with a displayed image, and to play back sequential groups of images (time lapse, burst, and panorama images) and to view movies from the video.

In review mode, the DVC 100 enables the user to rapidly review the contents of the DVC. In addition, the media objects may be edited, sorted, printed, and transferred to an external source.

Figure 4A:
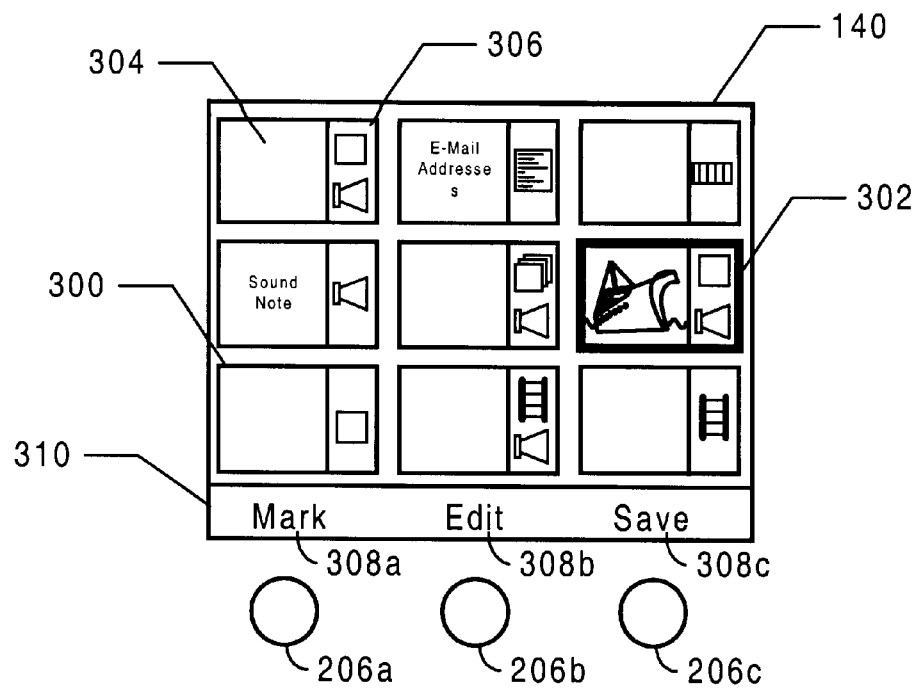
FIGS. 4A–B are diagrams illustrating one preferred embodiment of the review mode screen.

Referring now to FIG. 4A, a diagram illustrating one preferred embodiment of the review mode screen is shown. Moving the mode dial 202 (FIG. 2) to access the review mode enables the user to view all the media objects in the camera along with the specific media types associated with each of the objects.

The first embodiment of the review mode screen displays a series of object cells 300 that represent the media objects stored on the DVC 100, and a command bar 310. The display screen 140 is shown here as displaying nine object cells 300, although other numbers are also suitable.

The user may navigate through a series of displayed object cells 300 in the display screen 140 using the four-way navigation control 200. The object cell 300 currently selected by the four-way navigation control 200 is indicated by a highlighted area 302, which in this embodiment is shown as selection rectangle. Other shapes or indications that a object cell 300 is the currently active object cell are also suitable.

Each object cell 300 includes an image area 304 and an icon/information area 306. In the case of a still image, the image area 304 of a object cell 300 displays a thumbnail of the media object, which in the case of an image-based media object is a small, low-resolution version of the image. In the case of sequential images and video segments, the image area 304 of a object cell 300 displays a representative thumbnail or frame from the image sequence or video, respectively, typically the first one.

The icon/information area 306 displays one or more graphical icons and/or text information indicating to the user what media types have been associated with the media object displayed in the image area 304. The icon/information area 306 may be placed in various positions relative to the image area 304. However, in a preferred embodiment, the icon/information area 306 is displayed on the right-hand side of each object cell 300, as shown.

Figure 4B:
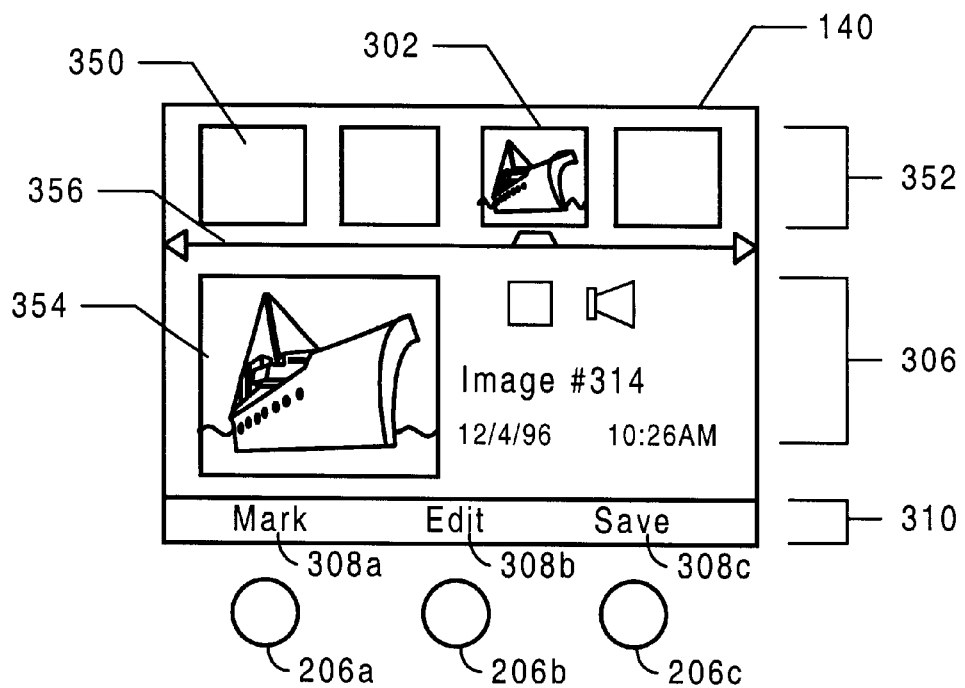

Referring now to FIG. 4B a diagram illustrating a second preferred embodiment of the review mode screen is shown, where like components share like reference numerals. In the second preferred embodiment, the review mode screen includes a filmstrip 352, the icon/information area 306 for displaying the media type icons associated with the active media object 302, a large thumbnail 354 showing a larger view of the active media object 302, and the command bar 310.

In a preferred embodiment, the filmstrip 352 displays four thumbnail images 350 at a time, although other numbers are also suitable. The user may navigate through the series of displayed thumbnails 350 in the display screen 140 using the four-way navigation control 200 (FIG. 2A). When the user holds down the left/right buttons on the four-way control 200, the thumbnails 350 are scrolled-off the display screen 140 and replaced by new thumbnails 350 representing other stored media objects to provide for fast browsing of the camera contents. As the user presses the buttons on the four-way control 200 and the thumbnails 350 scroll across the display screen 140, the thumbnail 350 that is positioned over a notch in the selection arrow line 356 is considered the active media object 302. When there are more than four media objects in the camera, the selection arrow line 356 displays arrowheads to indicate movement in that direction is possible with the left/right navigation buttons.

When a thumbnail 350 becomes the active media object 302, the media type icons corresponding to that media object are automatically displayed in the icon/information area 306, along with the large thumbnail 354. Other information can also be displayed, such as the name or number of the media object, and the date and time the media object was captured or created, for example.

In both the first and second embodiments of the review screen layout, displaying icons and text information in the icon/information area 306 according to the present invention provides the user with an automatic method identifying common groups of media objects. This also reduces the need for the user to switch to play mode to view the full-sized view of the object in order to recall the object's subject matter, which eliminates the need for decompressing the objects for display.

In a first aspect of the present invention, a method and apparatus is provided for creating and presenting a multimedia presentation from the heterogeneous group of media objects stored and displayed on the DVC 100. This is accomplished by navigating through several displays showing the heterogeneous media objects, selecting and marking the desired objects in the preferred order to create an ordered list of objects, and then saving the ordered list of objects as a slide show, thereby creating a new type of media object. After the slide show is created, the user may present the slide show wherein each media object comprising the slide show is automatically played back to the user in sequence that it was selected. The slide show may be played back on the display screen 140 and/or on an external television via the video out port.

In a second aspect of the present invention, each media object may be edited before or after incorporation into the slideshow, where each media object is edited using different media types editors designed to edit the media types associated with that particular object.

In a third aspect of the present invention, the user may specify parameters for slide show so that the objects in the slide show are not displayed linearly, but are displayed in an order that is dependent upon user defined events, thus creating an interactive slide show.

Each aspect of the present invention will now be explained in the sections below.

Slide Show Creation from Heterogeneous Media Objects

In a preferred embodiment, a slide show is generated by providing the DVC 100 with a marking and unmarking function within the user interface 114 that simultaneously provides for the selection and order of the heterogeneous media objects in the slide show.

Referring again to FIGS. 4A and 4B, in a preferred embodiment, the marking and unmarking function is implemented through the use of the soft keys 206a, 206b, and 206c displayed in the command bar 310, which are programmable, i.e., they may be assigned predefined functions. Hence, the name "soft" keys.

The function currently assigned to a respective soft key 206 is indicated by several soft key labels 308a, 308b, and 308c displayed in the command bar 310 on the display screen 140. In an alternative embodiment, the display screen 140 may be a touch-screen wherein each soft key 206 and corresponding label are implemented as distinct touch-sensitive areas in the command bar 310.

After a soft key label 308 has been displayed, the user may press the corresponding soft key 206 to have the function indicated by its label 308 applied to the current image. The functions assigned to the soft keys 206 may be changed in response to several different factors. The soft 206 keys may change automatically either in response to user actions, or based on predetermined conditions existing in the camera, such as the current operating mode, the image type of the media object, and so on. The soft keys 206 may also be changed manually by the user by pressing the menu button 210. Providing programmable soft keys 206 increases the number of functions that may be performed by the camera, while both minimizing the number of buttons required on the user interface 114, and reducing the need to access hierarchical menus.

In the first embodiment of the present invention, the soft keys 206 are "Mark", "Edit", and "Save". Although not shown, other levels of soft key functions may be provided to increase the number of functions the user could apply to the media objects.

In general, the mark function indicated by soft key label 308a enables a user to create a temporary group of media objects. After a group of media objects is created, the user may then perform functions on the group other than transforming the temporary group into a permanent slide show, such as deleting the group and copying, for example.

To create an ordered group of images, the user navigates to a particular media object using the four way control 200 and presses the "Mark" soft key 206a corresponding to the mark function indicated by soft key label 308a. In response, a mark number is displayed in the object cell 300 of the highlighted image 302 and the highlighted image 302 becomes a marked image. After an image is marked, the "Mark" soft key label 308a is updated to "Unmark". The "Unmark" function allows the user remove an image from the group, which removes the mark number from the object cell 300 of the highlighted image.

Figure 5:
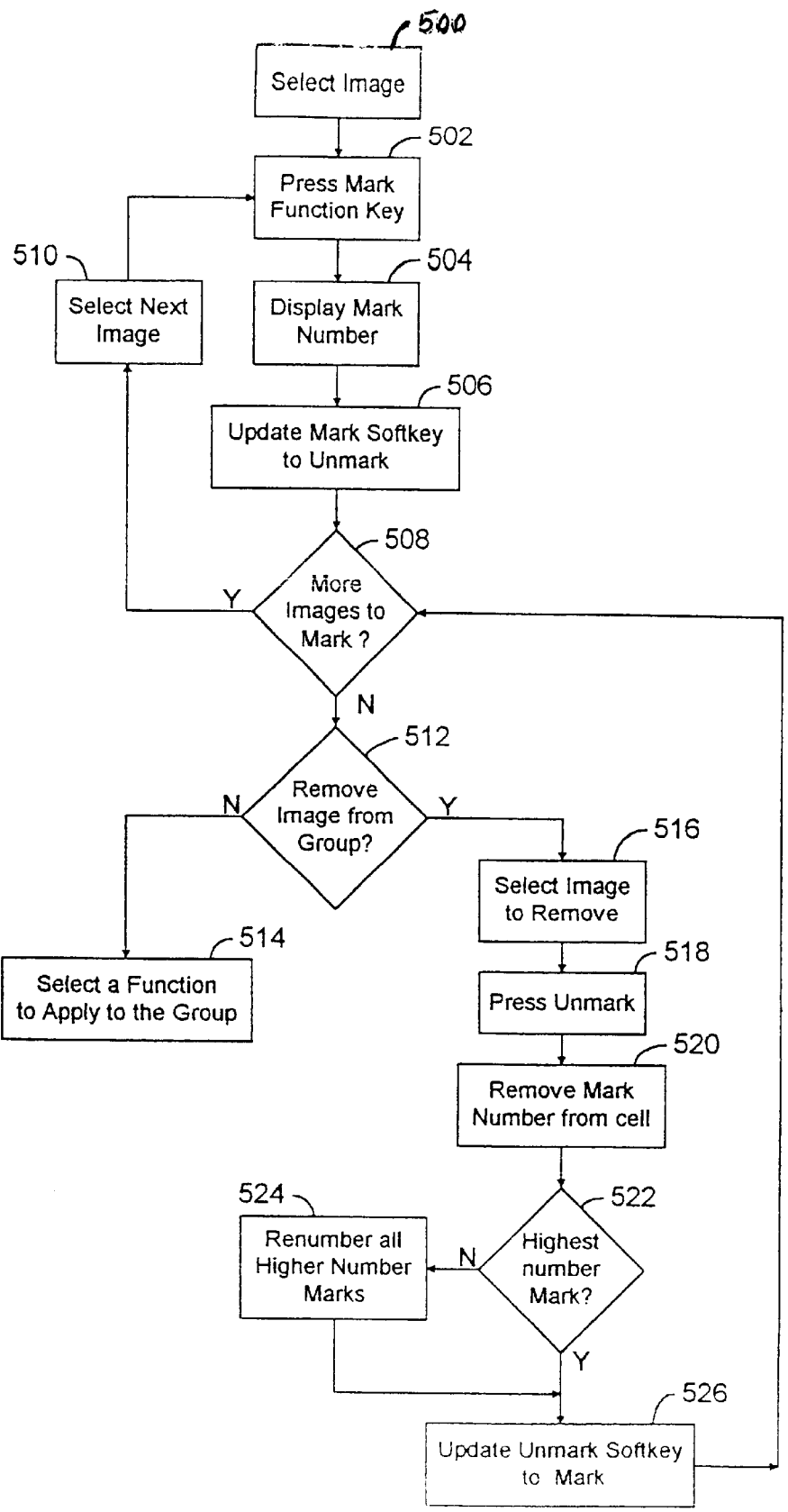
FIG. 5 is a flowchart depicting the process of creating an ordered group of heterogeneous media objects in accordance with the present invention.

According to the present invention, a user may randomly create an ordered group of heterogeneous media objects using the four-way navigation control 200, and the programmable function keys 206, as shown in FIG. 5.

FIG. 5 is a flowchart depicting the process of creating an ordered group of heterogeneous media objects in accordance with the present invention.

The process begins when a user selects a media object by positioning the highlight area 302 over the object cell 300, or otherwise selects the object cell 300, using the four-way navigational control 200 in step 500. The user then presses the function key corresponding to the Mark soft key label 308a in step 502. After the "Mark" soft key 206a is depressed, the object cell 300 is updated to display the number of images that have been marked during the current sequence in step 504. The object cell 300 may also be updated to display an optional graphic, such as a dog-ear corner or a check mark, for example. After the object cell 300 has been updated, the "Mark" soft key in the command bar is updated to "Unmark" in step 506.

Next, the user decides whether to add more media objects to the temporary set of marked media objects in step 508. If the user decides to add more media objects, then the user selects the next media object using the four-way navigational control 200, and the "Unmark" soft key in the command bar is updated to "Mark" in step 510.

If the user decides not to add more media objects to the temporary group of marked media objects in step 508, then the user decides whether to remove any of the marked media objects from the group in step 512. If the user decides not to remove any of the marked media objects from the group, then the user may select a function, such as "Save" or "Delete" to apply to the group in step 514.

If the user decides to remove a marked media object from the group, then the group is dynamically modified as follows. The user first selects the media object to be removed by selecting the marked media object using the four-way navigational control 200 in step 516. The user then presses the function key corresponding to the "Unmark" soft key in step 518.

After the "Unmark" key is depressed, the object cells 300 for the remaining marked media objects may be renumbered. This is accomplished by determining whether the selected media object is the highest numbered media object in the marked group in step 522. If the selected media object is not the highest numbered media object in the marked group, then the marked media objects having a higher number are renumbered by subtracting one from the respective mark number and displaying the result in their object cells 300 in step 524. After the mark number is removed from the unmarked media object and the other mark numbers renumbered if required, the "Unmark" soft key in the command bar is updated to "Mark" in step 526. The user may then continue to modify the group by marking and/or unmarking other media objects accordingly.

The process of grouping media objects in the digital camera will now be explained by way of a specific example with reference to FIGS. 4A, 4B, and 6–8.

Referring again to FIG. 4A, assume that the user wishes to create a slide show beginning with the selected media object 302. At this point, the soft keys displayed in the command bar are prompts to the user that the user may perform the displayed functions, such as "Mark", on the highlighted media object. The mark function is then performed by the user pressing the Mark function key 206a.

Figure 6:
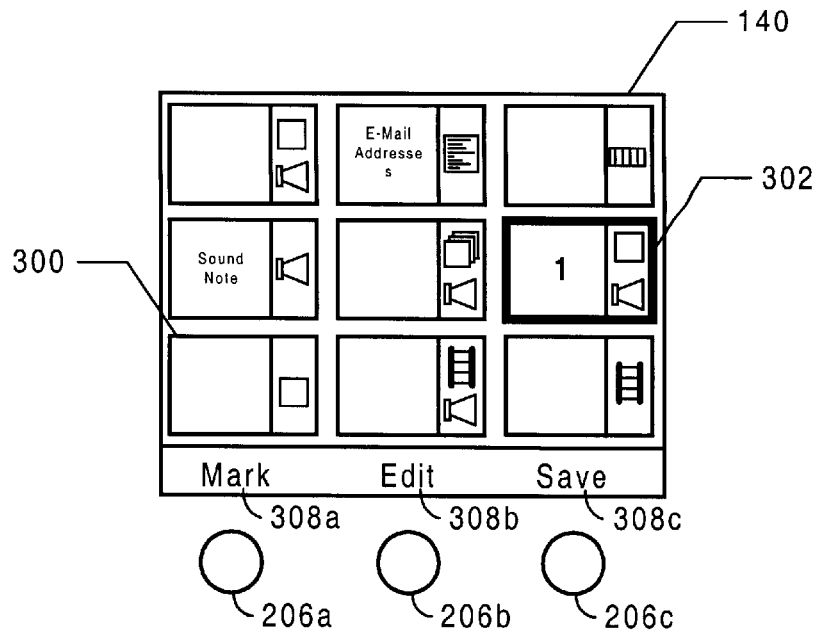
Figure 7:
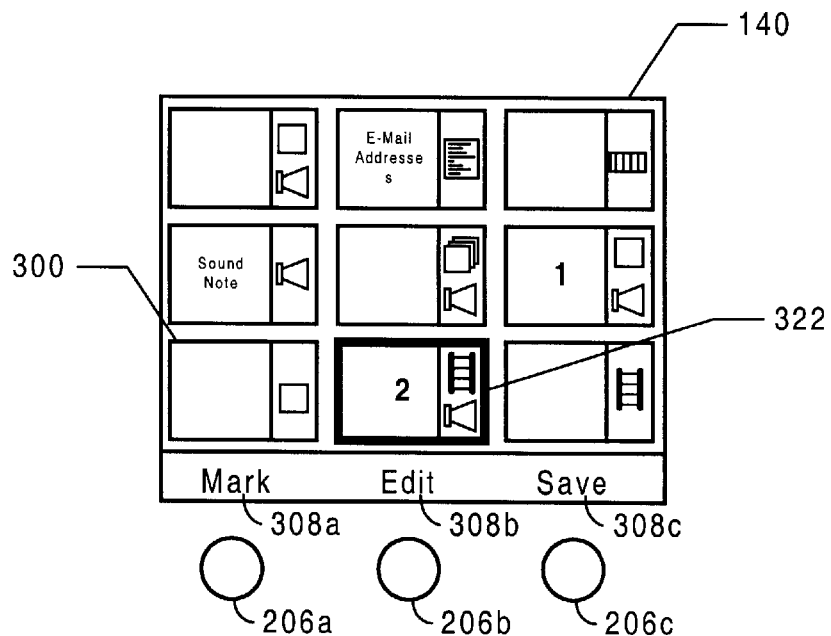

Referring now to FIG. 6 a diagram illustrating the result of the user pressing the Mark function key is shown. The selected media object cell 302 is updated with the number "1", which indicates that the media object is the first to be marked. FIG. 7 is a diagram showing the user marking another media object by selecting a second media object cell 322 and pressing the Mark function key. This causes the media object cell 322 to be updated with the number "2". FIG. 8 is a diagram showing a third media object being selected and marked, as described above, in which case, the icon area of the media object 342 is updated with the number "3".

Referring again to FIG. 5, while marking media objects, the method for removing media objects in the group (steps 512–524) also allows a user to dynamically reorder or re-sequence the media objects in the group. For example, assume the user has marked five media objects, labeled as "1", "2", "3", "4", "5", and wants to make media object "3" the last media object in the group. This can be accomplished by unmarking media object "3", which results in media objects "4", and "5" being renumbered "3" and "4", respectively. Thereafter, the user may mark the original media object "3", which results in the media object being labeled with the number "5".

Referring again to FIG. 4, after the group has been created with the chosen media objects in the desired sequence, the user saves the ordered group to create a slide show media object. In a preferred embodiment, the slide show media object is created using "Save" function shown in the command bar 310.

In one preferred embodiment, pressing the soft key 206c assigned the "Save" function creates a metadata file, which is a file containing data that describes other data.

Referring to FIG. 9A, a diagram illustrating a slide show object 360 implemented as an exemplary metadata file is shown. The metadata file includes a series of fields that acts a play list when the file is read by identifying one or more of the following attributes for each media object:

a) A pointer to, or the address of, the media object,
b) An identification of each media object's associated media types; and
c) A duration of play. Creating a metadata file that simply points to the real media objects saves storage space since the original media objects do not have to be duplicated.

In a second preferred embodiment, pressing the soft key 206c assigned the "Save" function (FIGS. 4A and 4B) creates a permanent group of media objects by copying all of the marked media objects either into a file, a folder, or a directory on the DVC's mass storage device 122. A dialog box or other type of prompt appears asking the user to name the new file, folder, or directory.

Referring to FIG. 9B, a diagram illustrating a slide show object 360' implemented as a file directory is shown. A directory named "slide show" is created for the slide show 360', where the name of the directory may be input by the user. After the directory is created, each marked media object is then copied to the directory as shown. Since the media objects are copied, the original media objects are left in tact, and the new slide show object 360' may be transferred to an external source.

After the slide show 360 has been created using any of the described embodiments, it is displayed as a new media object cell 300 on the display screen 140 along with an icon indicating that the media object is a slide show. Selecting the new slide show object cell 300 and pressing the display button 204 or switching to play mode causes each of the media objects included in the "slide show" to be individually played back on the display screen 140 in the sequence that they were marked without user intervention.

In the case of a slide show 360 created as metadata file, the slide show is played by executing the metadata file, causing each media object listed to be fetched from memory and played in the order listed in the file. In the case of a slide show 360' created as a standard file or directory, the slide show 360' is played by displaying each media object in the order and listed.

When the slide show is presented, each media object therein is played by playing each of the media types comprising the object. For example, a still image is played by displaying the image for a predefined time on the display screen 140 while playing any associated audio. Sequential images are played by displaying each still comprising the sequential image while playing any associated audio. Video segments are played as a convention movie. A text-based object is played by displaying the text on the display screen 140. And a stand-alone audio clip is played by displaying a blank screen or the name of the clip while the audio is played through the DVC's 100 speakers.

Figure 10:
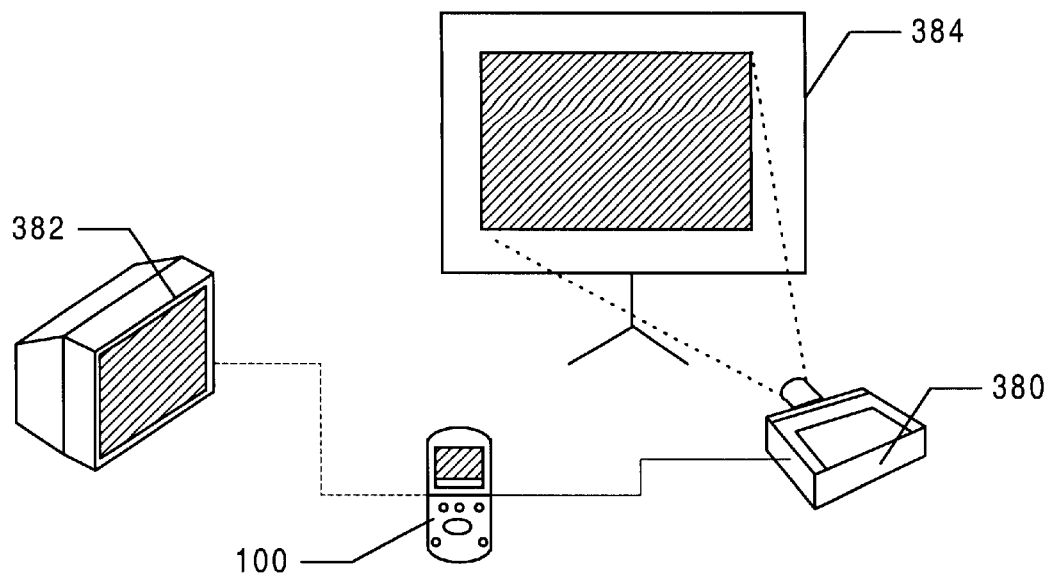
FIG. 10 is a diagram illustrating the DVC connected to external projector, and alternatively to a television.

According to the present invention, by connecting the DVC 100 to an external projector or television via the video out port, and playing the slide show 360, the camera can be used as a presentation device in place of a notebook computer, as shown in FIG. 10.

FIG. 10 is a diagram illustrating the DVC 100 connected to external projector 380, and alternatively to a large television 382. When the slide show 360 is played, the images, video and audio are automatically displayed directly on the large screen 384 or on the screen of the television 382 from the DVC 100. Thus, the present invention enables a novice user to show multimedia presentations without the need for downloading images and/or video to a computer for incorporation into presentation software to create a multimedia presentation.

Editing Media Objects

Referring again to FIG. 8 in a second aspect of the present invention, the DVC 100 is provided with an advanced feature that allows the user to edit the media objects either before or after incorporation into the slide show 360 using specialized media type editors. In one preferred embodiment, the user edits the slide show 360 by selecting the slide show object in either review or play mode, and then pressing the "Edit" soft key 206b. In response a slide show edit screen appears displaying the thumbnail images of all the media objects in the slide show.

Figure 11:
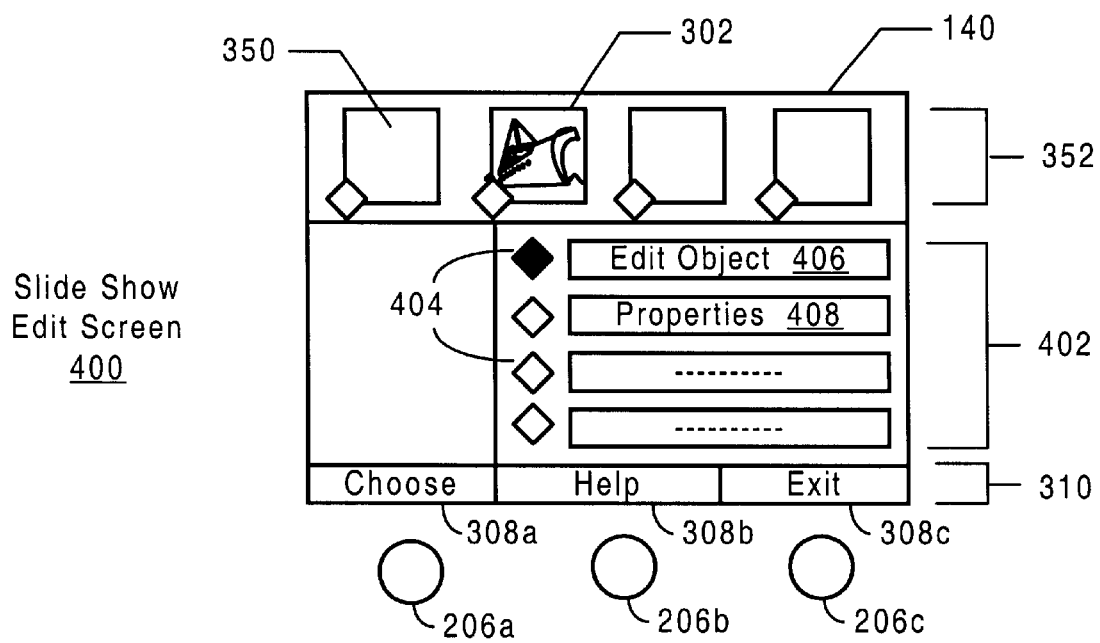
FIG. 11 is a diagram illustrating the components of the slide-show edit screen in accordance with the present invention.

Referring now to FIG. 11, a diagram illustrating the components of the slide show edit screen is shown in accordance with the present invention. The slide show edit screen is based on the review screen layout of FIG. 4B, where like components share like reference numerals. The slide show edit screen 400 includes, the filmstrip 352, a list page 402, and the command bar 310. The filmstrip 352 displays a scrollable series of thumbnails representing all the media objects in the slide show. The list page 402 displays a scrollable list of menu items that can be applied to the selected media object. And the command bar 310 displays several of soft key functions 308.

In the implementation shown in FIG. 11, the user may move a target cursor to discrete cursor locations 404 within the screen 400, shown here as diamond shapes, using the four-way navigational control 200. The cursor is active at any given time in either the filmstrip 352 or the list page 402. The current target-cursor location is shown as a black diamond, and the element associated with the current cursor location is the target element. In a preferred embodiment, the soft key labels 308 displayed in the command bar 310 are only associated with the target element.

To edit the slide show, the user navigates to the media object of interest in the filmstrip 352 and presses the "Choose" function 308a to select the targeted media object. In response, the target cursor location in the now inactive filmstrip 352 changes to a white diamond to show that the selection of the selected media object 302 is persistent. At the same time, the black diamond cursor appears in the active list page 402.

When in the list page 402, the item associated with the current cursor location becomes the target item and the recipient of the functions in the command bar 310. While the list page 402 is active, the "Exit" function saves the state of the list page 402 and moves the target cursor back to the selected media object 302 in filmstrip 352. The "Help" function offers assistance with the target item.

From the list page 402, the user may choose the "Edit Object" item 406 for editing the selected media object 302, or choose the "Properties" item 408 to change the properties associated with the selected media object 302. Choosing the "Edit Object" item 406 invokes an edit screen for editing the selected media object's content, which means editing the media types associated with the selected media object. In a preferred embodiment, for editing still image and sequential image media types, an image editor appears to enable the user to change the appearance of the image(s). For video, a video editor appears to enable the user to edit and rearrange scenes. For the audio, a sound editor appears to enable the user to edit the sound. And for text, such as a list of email addresses for example, a text editor appears to enable the user to modify the text.

According to the present invention, all four editing screens operate similar to the slide show editing screen 400 to ease the use and operation of the editing functions and facilitate the creation of multimedia presentations by non-computer savvy users.

Figure 12:
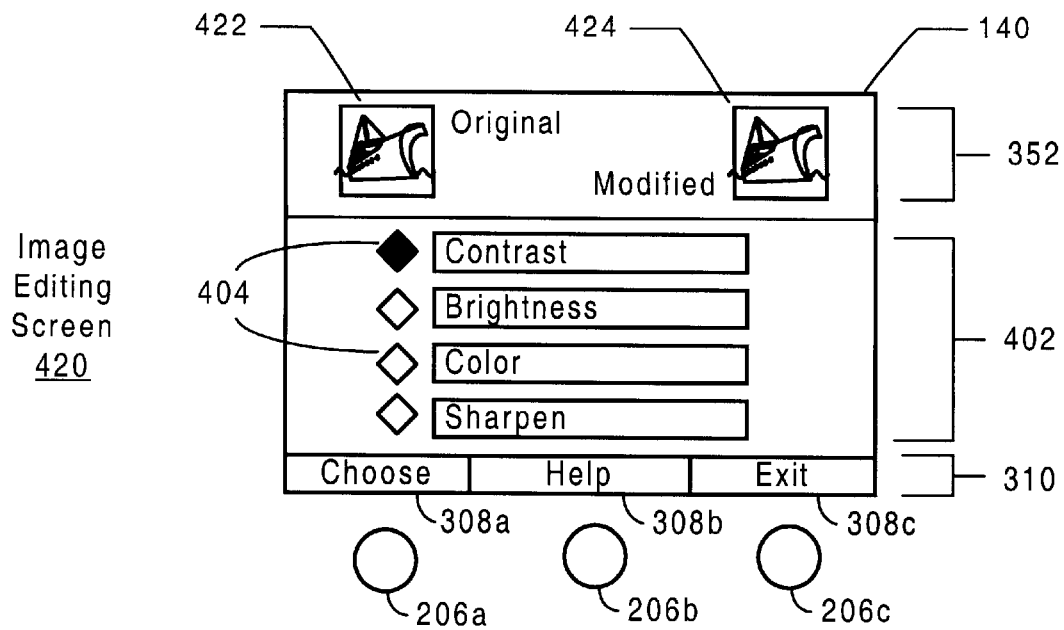
FIG. 12 is a diagram illustrating the image editing screen.

Referring now to FIG. 12, a diagram illustrating the image editing screen 420 is shown. The image editing screen 420 displays the thumbnail image 422 of the selected media object in the filmstrip 352 along with a real time preview of the modified image 424. The user may select which editing function to apply to the selected media image 422 by moving the target cursor to the item in the list page 402 and pressing the "Choose" softkey 206a. In response, a menu or screen showing modifiable parameters for the selected item is displayed. When the parameters are changed, the results are applied to the selected image and displayed as the modified image 424. The user may then choose to keep or discard the changes.

Figure 13:
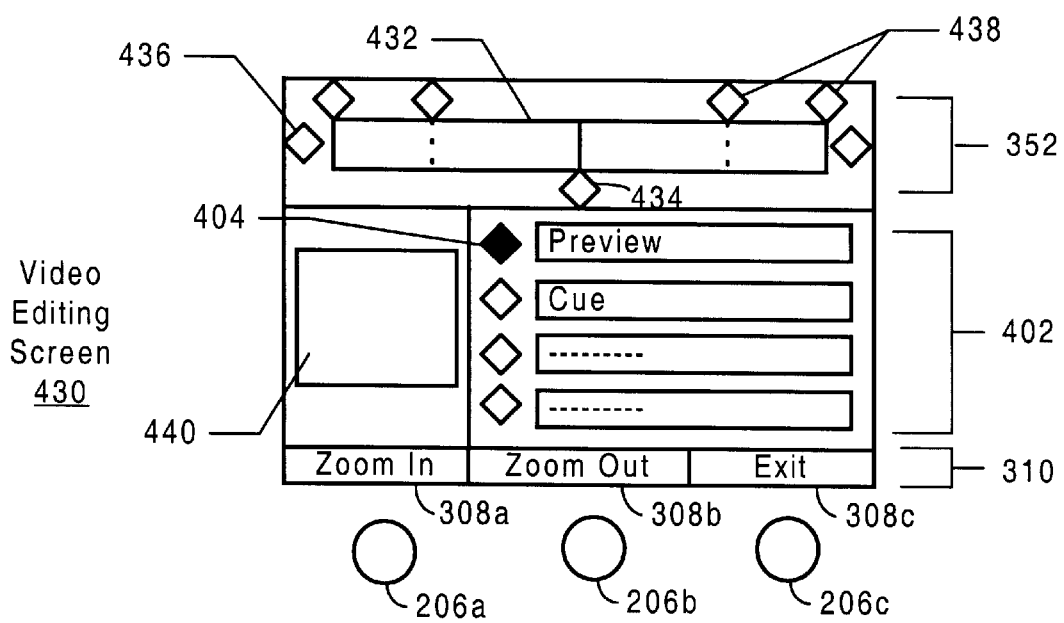
FIG. 13 is a diagram illustrating the video editing screen.

Referring now to FIG. 13, a diagram illustrating the video editing screen is shown. The video editing screen 430 displays a movie graph 432 in the filmstrip 352 showing a pictorial representation of a video's duration, a position of a playback head 434, and cue locations 436 and 438 that mark significant moments in the video. The video's duration can be sized to fit the length of the movie graph 432 or scaled up and down via the "Zoom In" and Zoom Out" soft key functions 308a and 308b. A preview pane 440 is provided to play back that portion of the video shown in the filmstrip 352.

The position of the playback head 434 is preferably located in the center of the movie graph 432 and marks the current frame. The movie scrolls forwards and backwards under the playback head 434. The cursor locations 436 (diamonds) on the left and right sides of the movie graph 432 control scrolling. The user may play back the video by navigating to the "Preview" item in the list page 402, causing that portion of the video to play in the preview pane 440.

The cues 438 displayed across the top of the movie graph 432 are associated with the visible video duration. The user may define clips within the video by marking begin and end frames with cues 438. After defining the clip, the user may copy, move, or delete the clip.

FIGS. 14–17 are diagrams illustrating the process of editing a video on the DVC 100 by creating and moving a clip.

Figure 14:
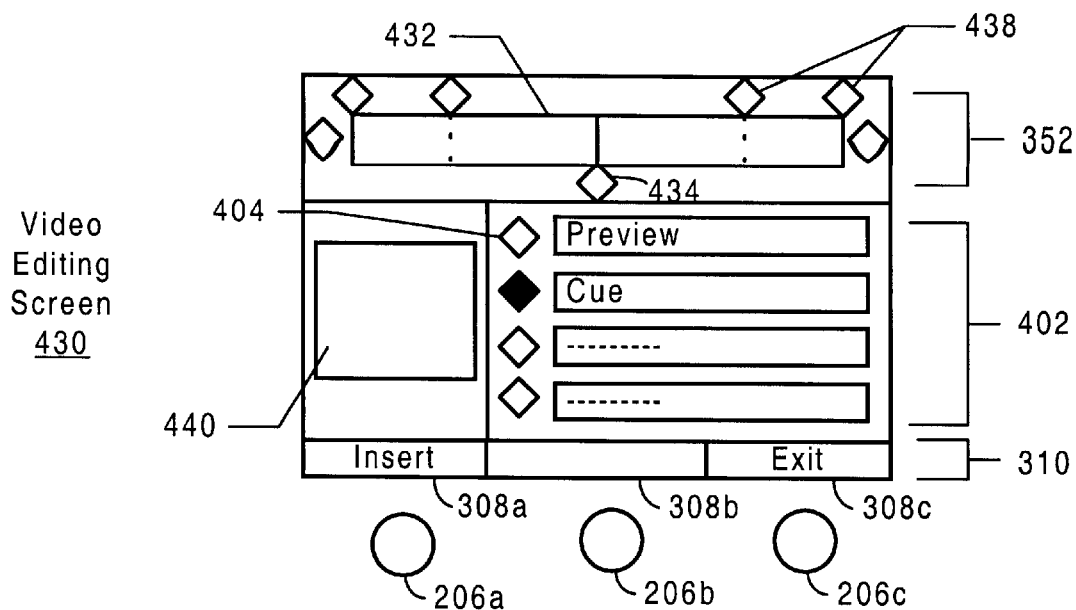
FIGS. 14–17 are diagrams illustrating the process of editing a video on the DVC by creating and moving a video clip.

Referring to FIG. 14, the process of creating a clip begins by defining and inserting a new cue by navigating to the "Cue" item in the list page 402 and pressing the "Insert" softkey 206a."

Figure 15:
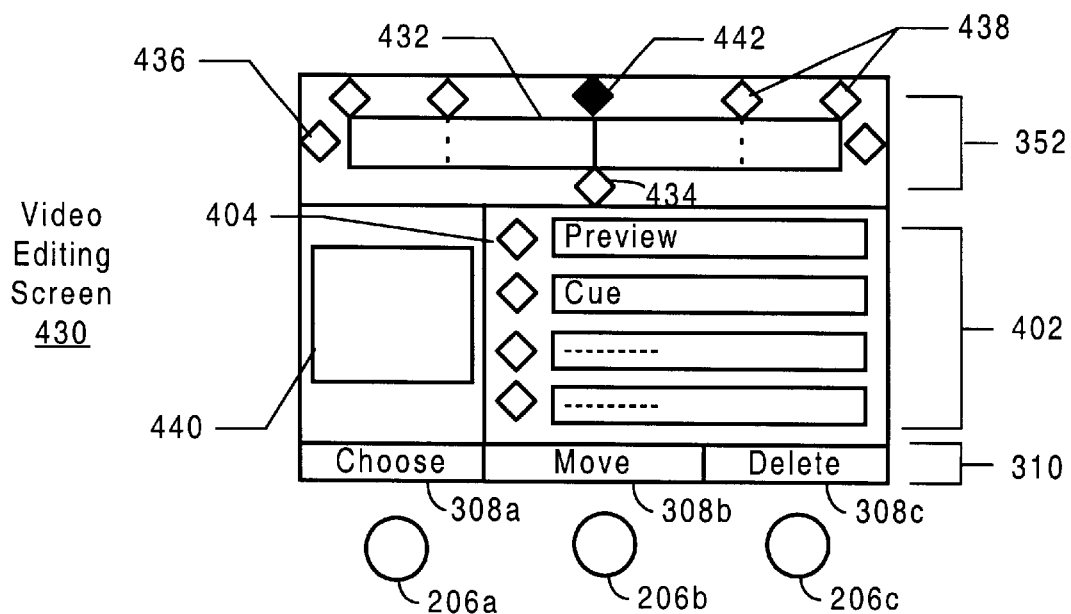

FIG. 15 shows that by default the inserted cue 442 is positioned along the movie graph 432 on the current frame marked by the playback head 434. When a cue is inserted, or otherwise targeted by the cursor, the command bar 310 is updated enable the user to select, move, or delete the cue. Pressing the "Choose" soft key 206a marks the current cue position as the beginning frame of the video clip.

Figure 16:
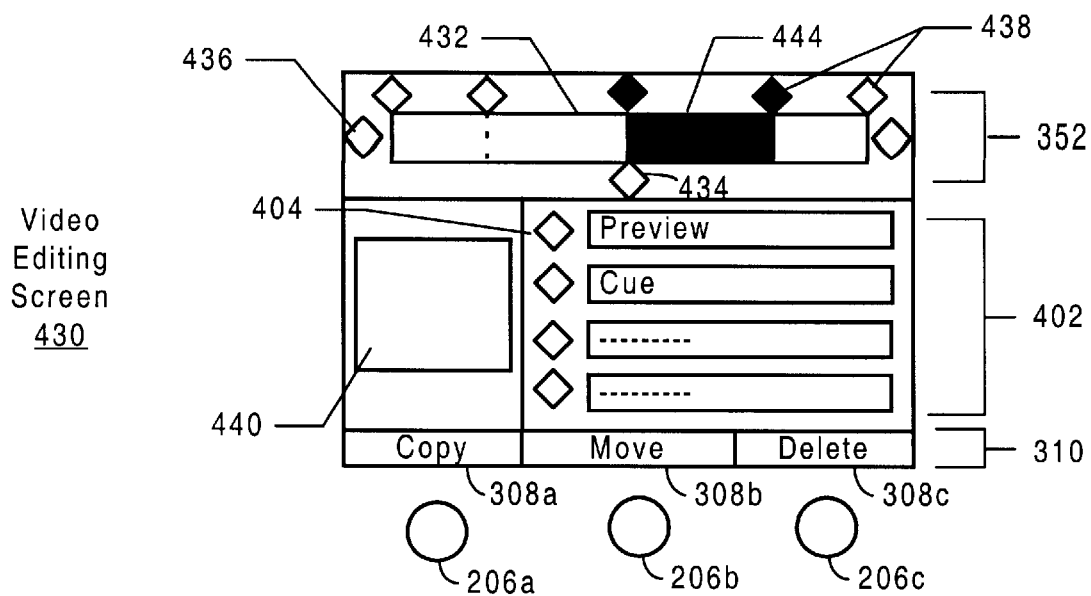

Referring now to FIG. 16, after defining the start of the clip, the user navigates left or right to another cue location 438, and presses the "Choose" soft key 206a again to define the end frame of the clip. The duration of the video between the two clips becomes a selected clip 444, as shown in FIG. 16. After the clip 444 is created, the command bar 310 is updated to enable the user to copy, move, or delete the clip. To move the clip 444, the user presses the "Move" soft key 206b.

Figure 17:
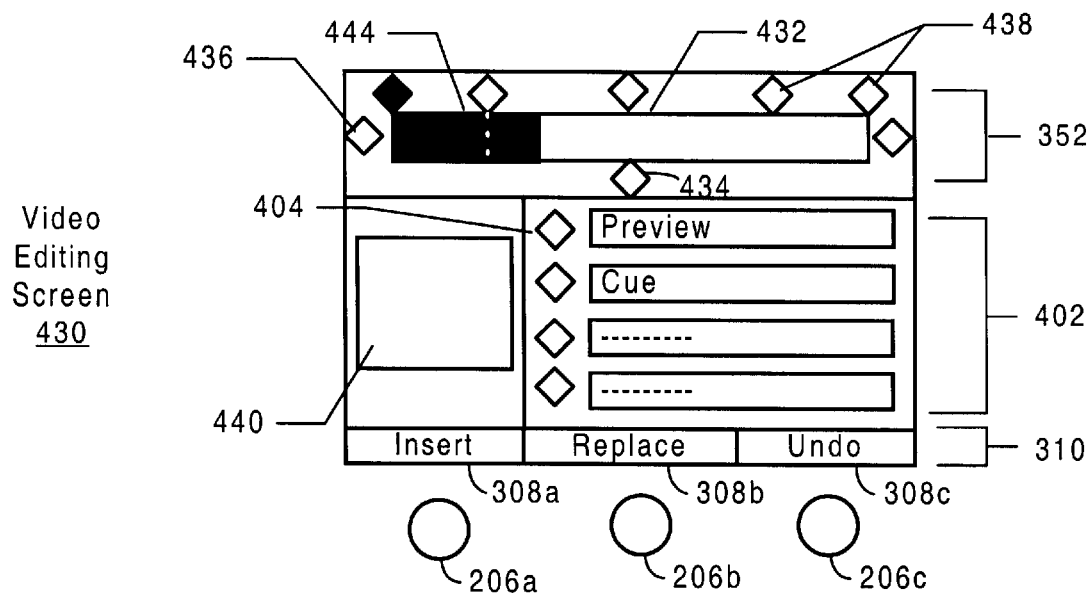

Referring now to FIG. 17, in move mode, the user may drag the clip 444 left and right to the desired location in the video using the navigation control 200. The video will scroll if required. The user can choose to insert the clip 444 at its new location by pressing the "Insert" soft key 206a (which "offsets" the video content underneath it), or replace the video content with the clip content by pressing the "Replace" soft key 206a. If the user inserts the clip 444, all cues downstream are preferably offset by the duration of the clip. Once the clip 444 is dropped into its new position, the move mode is turned off, and the user may edit the clip, navigate to another clip, or navigate to the list page to perform other operations.

According to the video editing screen 430 of the present invention, novice users are provided with a way to edit digital video directly on the DVC. Thus the present invention eliminates need for downloading the video to a PC and editing the video with some complex video editing package geared towards expert videophiles.

Figure 18:
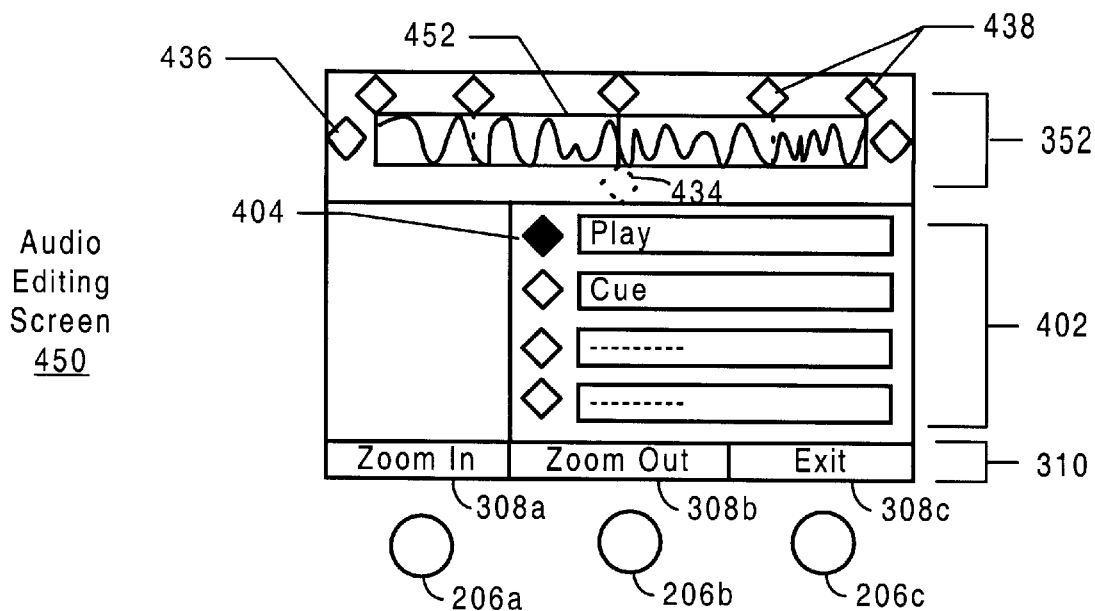
FIG. 18 is a diagram illustrating an audio editing screen for editing audio media types.

Referring now to FIG. 18, a diagram illustrating an audio editing screen for editing audio media types is shown. The audio editing screen 450 appears and operates like the video editing screen 430, except that a waveform 452 depicting the recorded audio is displayed in the filmstrip 352. The user may hear the audio by selecting the "Play" item in the list page 402, or insert cues as described above by selecting the "Cue" item.

Figure 19:
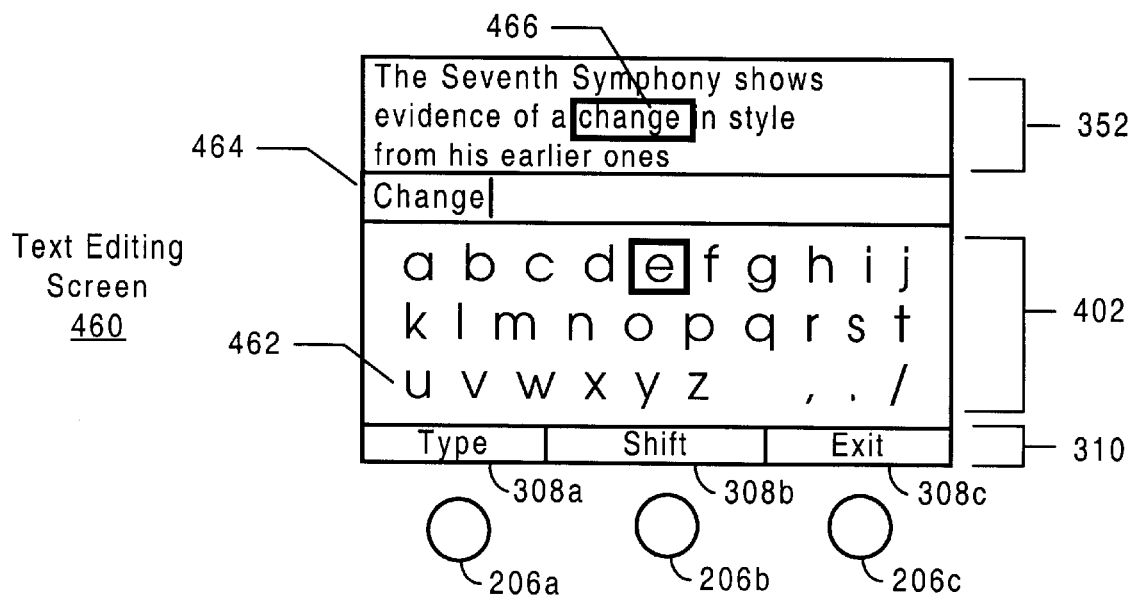
FIG. 19 is a diagram illustrating a text editing screen for editing text media types.

Referring now to FIG. 19, a diagram illustrating a text editing screen for editing text media types is shown. The text editing screen 460 allows the user to edit text-based media objects. The text editing screen 460 uses the filmstrip 352 for displaying text that is to be edited, and includes a keyboard 462 in the list page 402, and an edit field 464.

To enter text, the user navigates to a desired character in the keyboard 462 and presses the "Type" soft key 206a whereupon the letter appears in the both the filmstrip 352 and the edit field 464. The user may edit a current word 466 by press the "up" button twice on the four-way navigational control 200 to enter the filmstrip 352. A cursor may be moved back and forth using the navigational control 200 to select a word 466, causing the word to appear in the edit field 464. The word may then be edited using the key board 462.

Modifying the Slide Show to Create an Interactive Presentation

Referring again to FIG. 11, after creating and/or editing the slide show, the slide show is ready to present. According to a third aspect of the present invention, the user may choose different presentation styles to apply to the slide show to create interactive presentations. In addition, the user may change the properties of media objects so that the objects in the slide show are not displayed linearly during playback, but rather are displayed in an order that is dependent upon user defined events.

In a preferred embodiment of the present invention, three presentation styles are provided. The first presentation style is to play back the media objects in the order that they were marked by the user during slide show creation. This is the default style. After creating the slide show, all the user need do is press the display button 204 and the slide show will present itself automatically.

The second presentation style is random access, where the play back order is controlled manually by the user using the four-way navigational control 200 (FIG. 2). According the to the present invention, the functions of the four-way navigational control 200 are changed during slide show presentation FIG. 19 is a diagram illustrating the mapping of functions to the four-way control during slide show presentation. The function mapped to the right (or forward) button 200a is to display the next media object in the slide show when the button 200a is pressed. The function mapped to the left button 200b is to display the next media object in the slide show when the button 200b is pressed. And the function mapped to either the up or down buttons 200c and 200d is to display a list of media objects in the slide show when either the up or down buttons 200c and 200d is pressed. Once the list is displayed, the user can scroll to a desired media object and select that media object to cause it to be displayed, thus providing random access to the objects in the slide show during presentation.

The third presentation style is branching, which allows the user to associate branches to a particular media object that indicate which media object in the slide show will be played after the current media object. During playback, the user controls whether or not the branch should be taken.

Referring again to FIG. 11, in a preferred embodiment, the user establishes the branch associations by navigating to a desired media object in the slide show and selecting the "Properties" item 408 from the list page 402. In response, a properties page is displayed.

Figure 21:
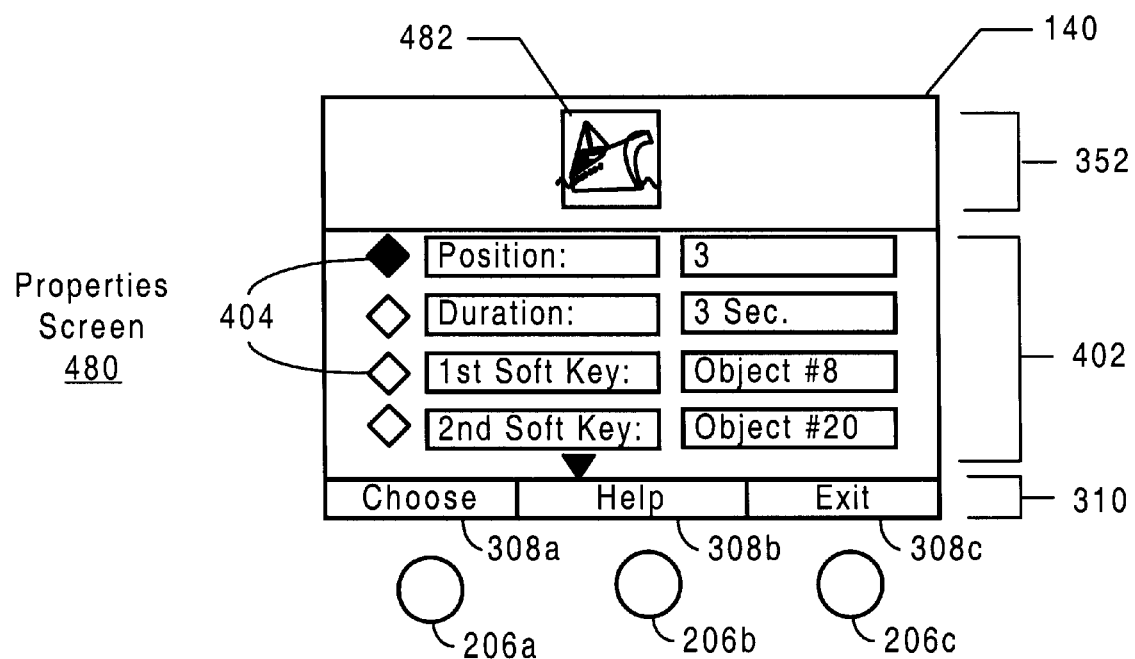
FIG. 21 is a diagram illustrating the properties page of a media object.

Referring now to FIG. 21, a diagram illustrating the properties page of the current media object 482 is shown. The properties page 480 displays the thumbnail of the current media object 482 in the filmstrip 352. The list page 402 displays a scrollable list of user-defined properties associated with the current media object 482 that control how and when the media object is played back during the slide show presentation. The user chooses which property to change by moving the target cursor to the discrete cursor locations 404 using the four-way navigational control 200.

As shown, the first property the user may change is the media object's position in the slide show. This property allows the user to manually change the media object's order of play in the slide show. As an example, the number three indicates the current media object 482 is the third object that will be played during the presentation of the slide show.

Figure 20:
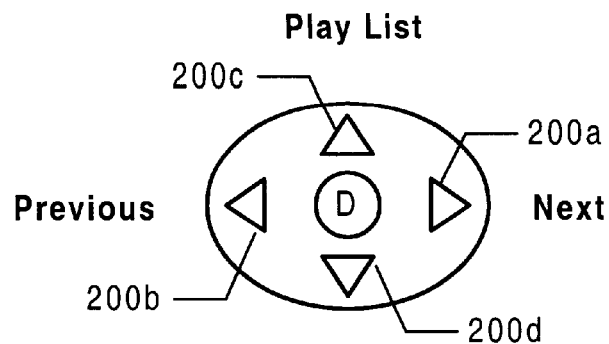
FIG. 20 is a diagram illustrating the mapping of the four-way control during slide show presentation.

The second property the user may change is the duration the media object will be played back before the next media object is played. In a preferred embodiment, three types of duration settings are provided. The first duration type is a predefined fixed duration, such as 3 seconds, for example. The second duration type is automatic and is used when the media object includes audio. The automatic setting causes the media object to be played for the duration of the associated audio. The third type of duration is random, where the user overrides the duration setting by manually playing the next media object using the navigation control during slide show presentation, as described with reference to FIG. 20.

As stated above, another property the user may change is branching, which causes the slide show to branch to predefined media objects during presentation. In a preferred embodiment, the user specifies which media objects may be branched to by associating the media objects to the soft keys 206. When the edited media object is subsequently played in the slide show, the soft key labels 308 display the names of the specified media objects that may be branched to. When the user presses one of the soft keys 206, the slide show jumps to the specified media object and the presentation continues.

The example of FIG. 21 shows that the user has associated media object #8 with the first soft key 206a, and has associated media object #20 with the second soft key 206b. After the user has defined all the properties, the user may exit the properties screen 480 and edit the other media objects or play the newly created interactive slide show presentation.

When the slide show is presented, and the media object 482 edited in FIG. 21 is played, the user will have the options of allowing the slide show to play in the defined order or change the order of playback. The order of playback may be changed by playing adjacent media objects using the navigational control, or by using the soft keys 206 to branch to the media objects displayed in the command bar 310.

In accordance with the present invention, the properties screen 480, the text editing screen 460, the audio editing screen 450, the video editing screen 430, and the image editing screen 420 have been provided with an integrated user interface so that all the screens operate similarly, thus making the advance editing functions easy to learn by novice users. In addition, the variety of functions provided by the editing screens enable the user to edit the text, audio, video, and image media types all within a DVC.

In summary, a method and apparatus for creating and presenting a multimedia presentation comprising heterogeneous media objects in the digital imaging device has been disclosed. Although the present invention has been described in accordance with the embodiments shown, one of ordinary skill in the art will readily recognize that there could be variations to the embodiments and those variations would be within the spirit and scope of the present invention.

For example, the functions of creating the slide show, editing the heterogeneous media objects, and changing the properties of the heterogeneous media objects, may be included as part of the operating system, or be implemented as an application or applet that runs on top, or in place, of the operating system. In addition, the present invention may be implemented in other types of digital imaging devices, such as an electronic device for archiving images that displays the stored images on a television, for instance. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for editing heterogeneous media objects stored in a hand-held image capture device having a display screen, the method comprising the steps of:
   a) creating a slide show from randomly selected ones of the heterogeneous media objects stored in the hand-held image capture device, each one of the heterogeneous media objects comprising at least one media type, the media types including a still image, a sequential image, video, audio, and text;
   b) in response to a user editing the slide show, displaying a slide show edit screen, wherein a representation of each media object comprising the slide show is displayed on the display screen;
   c) enabling a user to randomly select media objects to edit;
   d) enabling the user to edit the selected media object's content; and
   e) enabling the user to edit properties associated with the selected media object.

2. A method as in claim 1 wherein step (d) further includes the step of:
   i) in response to a user editing the selected media object's content, invoking one or more specialized edit screens for editing the media types associated with the selected media object, wherein the specialized edit screens include an image editing screen for editing still and sequential images, a video editing screen for editing video, an audio editing screen for editing audio, and a text editing screen for editing text.

3. A method as in claim 2 wherein step (d) further includes the step of:
   ii) displaying in each one of the specialized editing screens, a representation of the selected media object's content, items to be applied to the selected media object, and at least one soft key function, whereby each one of the specialized editing screens operates in a similar manner to ease use and operation of the hand-held image capture device and to facilitate creation of multimedia presentations on the hand-held image capture device.

4. A method as in claim 3 wherein step (d) further includes the step of:
   iii) providing at least one of the specialized editing screens with discrete cursor locations, which the user navigates among using a navigation control.

5. A method as in claim 4 wherein step (c) further includes the step of:
   iv) providing at least one of the specialized editing screens with real time preview of editing functions applied to the selected media object.

6. A method as in claim 5 wherein step (b) further includes the steps of:
   i) displaying a plurality of thumbnail images on the display screen, wherein each thumbnail image represents one of the stored media objects; and
   ii) providing an icon area on the display screen for displaying an indication of the media types associated with a selected media object.

7. A method for editing heterogeneous media objects in a hand-held image capture device having a display screen, the method comprising the steps of:
   a) displaying a representation of each one of the media objects on the display screen, each one of the media objects having one or more media types associated therewith, wherein the media types include a still image, video, and audio;
   b) enabling a user to randomly select a particular media object to edit;
   c) in response to a user pressing a key to edit the selected media object, invoking one or more specialized edit screens for editing the media types associated with the selected media object, wherein
      i) if the media object includes a still image, then an image editing screen is invoked,
      ii) if the media object includes a video clip, then a video editing screen is invoked,
      iii) if the media object includes an audio clip, then an audio editing screen is invoked, and
      iv) displaying in each one of the specialized editing screens, a representation of the selected media object's content, items to be applied to the selected media object, and at least one soft key function, whereby each one of the specialized editing screens operates in a similar manner to ease use and operation of the hand-held image capture device and to facilitate creation of multimedia presentations on the hand-held image capture device.

8. A method as in claim 7 wherein the media types further include a sequential image, and text, step (c) further including the steps of:
   v) if the media object includes text, then a text editing screen is invoked.

9. A method as in claim 7 wherein step (c) further includes the step of:
   providing at least one of the specialized editing screens with discrete cursor locations, which the user navigates among using a navigation control.

10. A method as in claim 9 wherein step (c) further includes the step of:
    providing at least one of the specialized editing screens with real time preview of editing functions applied to the selected media object.

11. A method as in claim 10 wherein step (b) further includes the steps of:
    i) displaying a plurality of thumbnail images on the display screen, wherein each thumbnail image represents one of the stored media objects; and
    ii) providing an icon area on the display screen for displaying an indication of the media types associated with a selected media object.

12. A hand-held image capture device for editing heterogeneous media objects, comprising:
    a randomly-accessible mass storage device for storing the heterogeneous media objects, each one of the media objects having one or more media types associated therewith, wherein the media types include a still image, a sequential image, video, audio, and text;
    a video codec for decoding the video associated with a stored media object when the stored media object is to be displayed;
    a hardware user interface for displaying the heterogeneous media objects, the hardware user interface including a navigational control, and means to select one of the media objects; and
    processing means coupled to the mass storage device, the video codec, and to the hardware user interface for controlling operation of the hand-held image capture device, the processing means functioning such that in response to the using randomly selecting one of the media objects to edit, the processing means invokes one or more specialized edit screens for editing the media types associated with the selected media object, wherein the specialized edit screens include an image editing screen for editing still and sequential images, a video editing screen for editing video, an audio editing screen for editing audio, and a text editing screen for editing text.

13. A hand-held image capture device as in claim 12 wherein the each one of the specialized editing screens displays a representation of the selected media object's content, editing items to be applied to the selected media object, and at least one soft key function, whereby each one of the specialized editing screens operates in a similar manner to ease use and operation of the hand-held image capture device and to facilitate creation of multimedia presentations on the hand-held image capture device.

14. A hand-held image capture device as in claim 13 wherein at least one of the specialized editing screens includes discrete cursor locations, which the user navigates among using a navigation control.

15. A hand-held image capture device as in claim 14 wherein at least one of the specialized editing screens displays a real time preview of selected editing items applied to the selected media object.

16. A hand-held image capture device as in claim 15 further including a display screen, wherein the processing means displays thumbnail images on the display screen representing the stored media objects, and provides an icon area on the display screen for displaying an indication of the media types associated with the selected media object.

17. A hand-held image capture device as in claim 16 wherein each one of the selected media objects to edit are stored in a slide show media object.

* * * * *